H. J. HICK & A. F. STAPLES.
FILING APPLIANCE.
APPLICATION FILED AUG. 20, 1910.
1,157,160.
Patented Oct. 19, 1915.
3 SHEETS—SHEET 3.
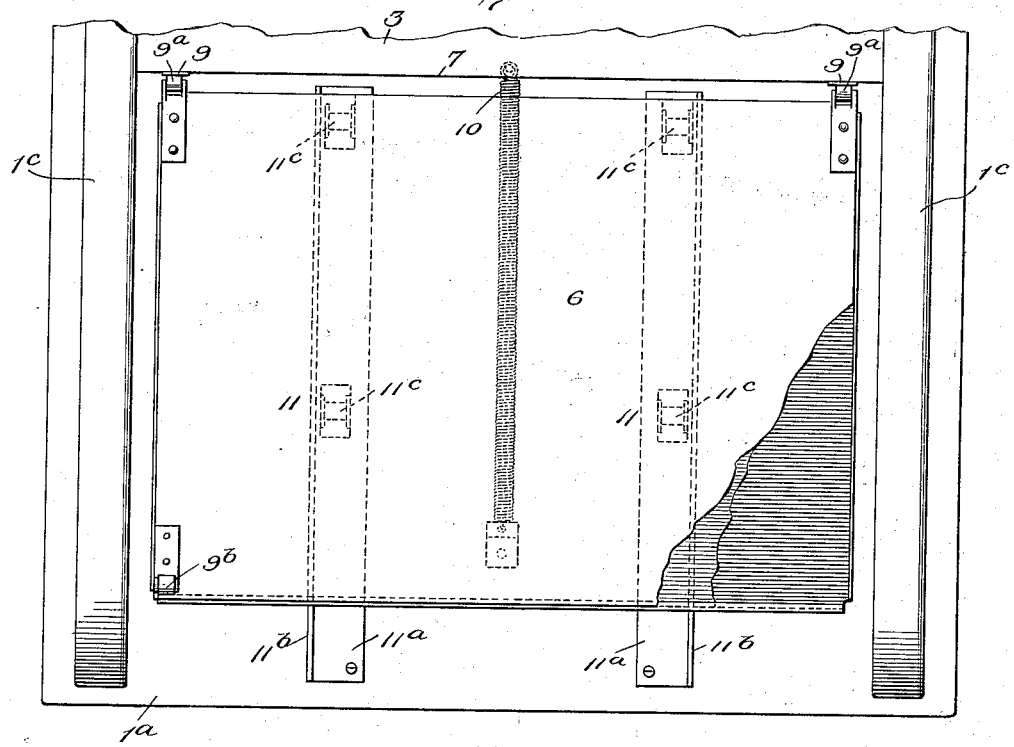
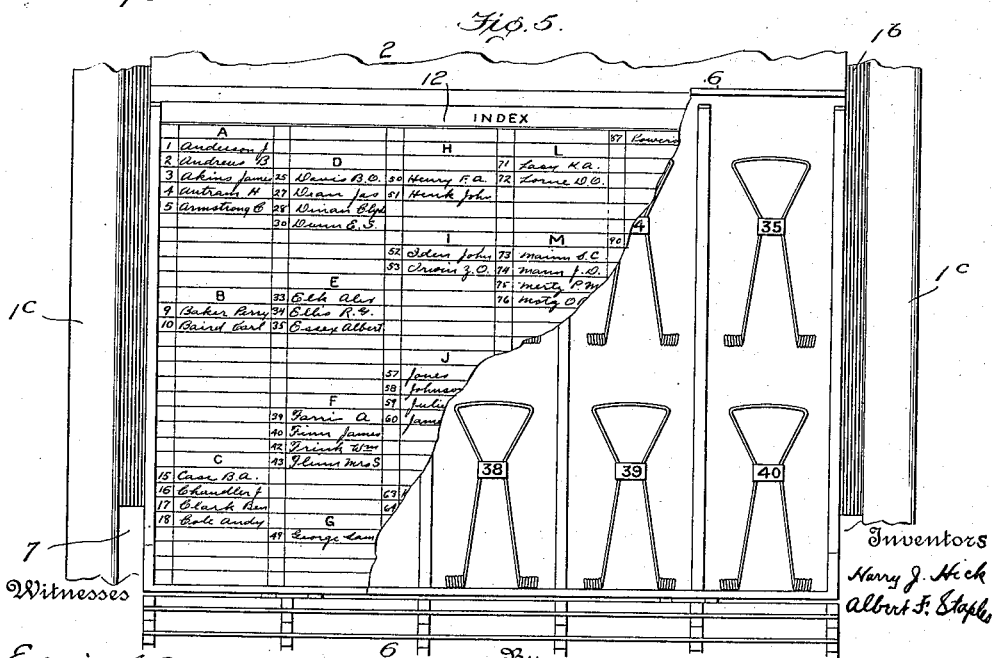

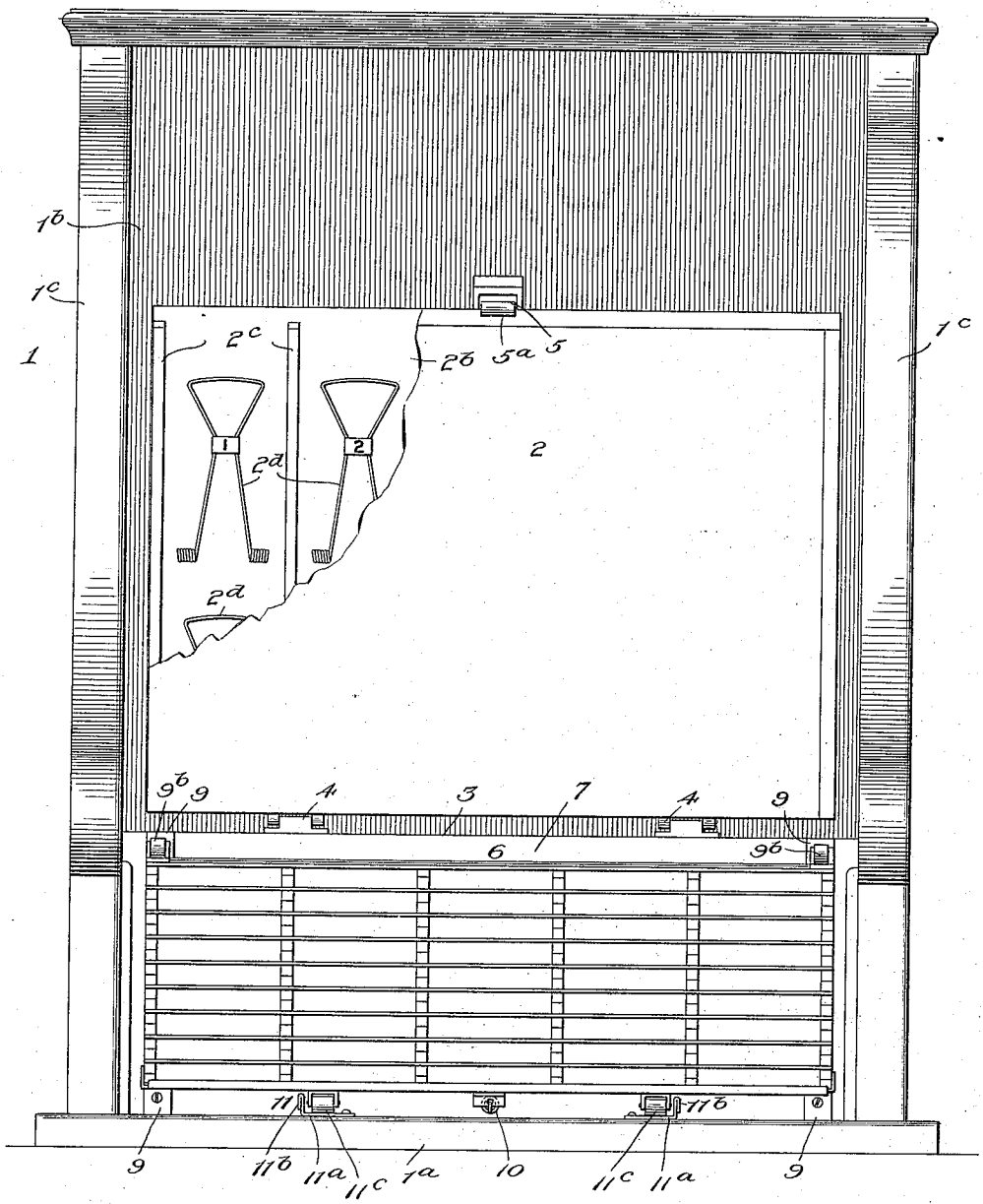

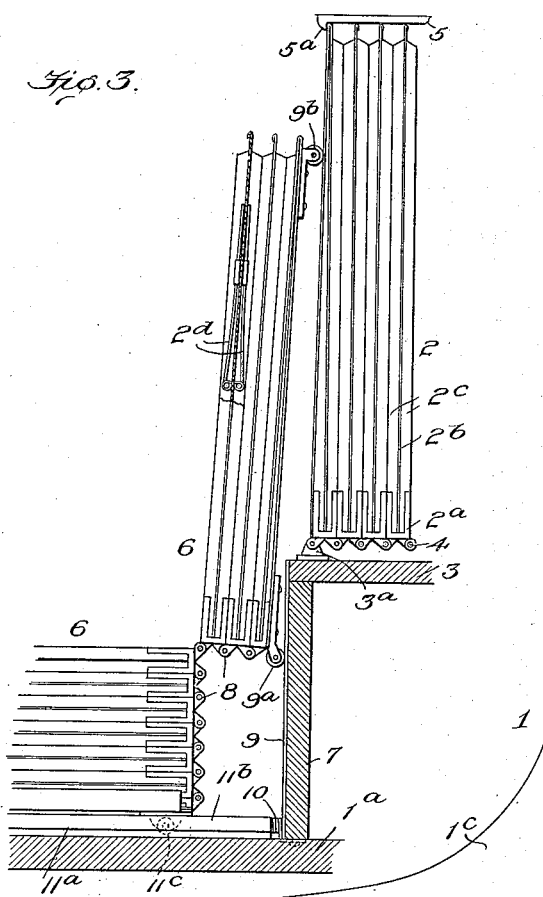
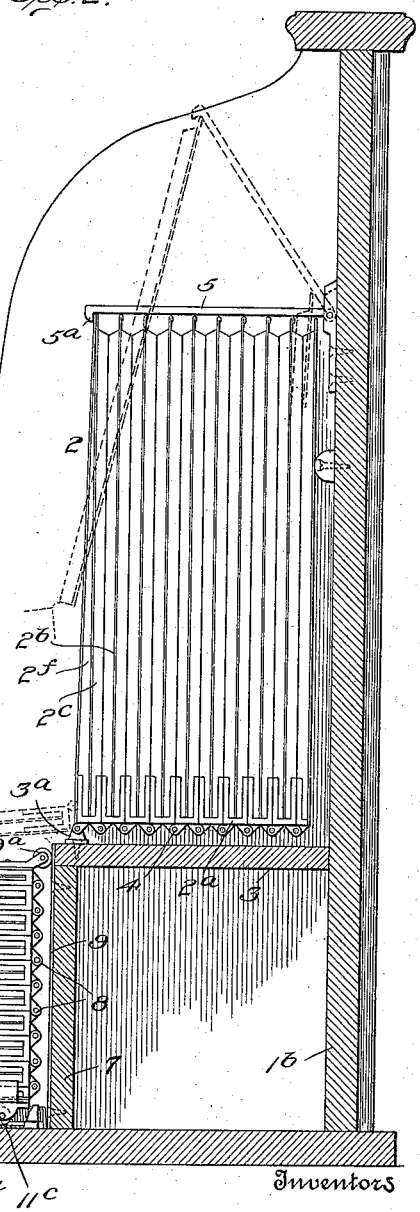
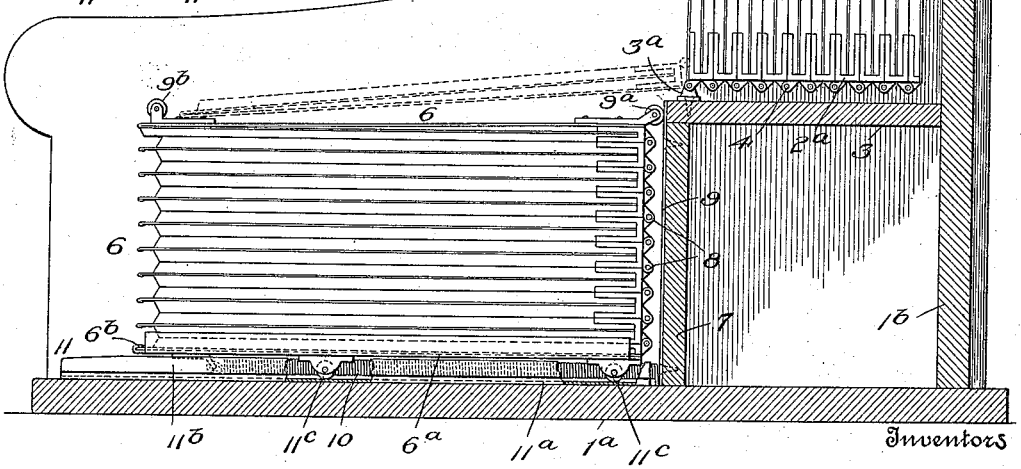

UNITED STATES PATENT OFFICE.

HARRY J. HICK AND ALBERT F. STAPLES, OF ALLIANCE, OHIO, ASSIGNORS, BY MESNE ASSIGNMENTS, TO THE McCASKEY REGISTER COMPANY, (INCORPORATED IN 1914,) OF ALLIANCE, OHIO, A CORPORATION OF OHIO.

FILING APPLIANCE.

1,157,160.  Specification of Letters Patent.  Patented Oct. 19, 1915.

Application filed August 20, 1910. Serial No. 578,137.

*To all whom it may concern:*

Be it known that we, HARRY J. HICK and ALBERT F. STAPLES, citizens of the United States, both residing at Alliance, in the county of Stark and State of Ohio, have invented certain new and useful Improvements in and Relating to Filing Appliances, of which the following is a specification.

This invention relates to filing appliances. For the purpose of illustration, we have, in the accompanying drawings, shown and herein described one form of filing appliance embodying our invention.

Figure 1 is a front view of a filing appliance embodying our invention. Fig. 2 is a side elevation, the near side of the casing being removed and parts being broken away. Fig. 3 is a side elevation of a portion of the appliance showing some of the leaves of one set in operative position. Fig. 4 is a plan view of the horizontal set of leaves. Fig. 5 is a front view of a portion of the appliance shown in Fig. 3, parts of the elevated leaves being broken away.

In the drawings, 1 indicates a casing preferably comprising a base $1^a$ and a back $1^b$, and side members $1^c$, $1^c$.

2 indicates a set of leaves normally arranged in substantially upright position and adapted to swing or recline singly or in groups from normal position to a substantially horizontal position. Each of the leaves 2 preferably comprises a suitable base or hinge member $2^a$, a back $2^b$, spacing strips $2^c$, arranged along their opposite faces at either edge, and slip clamps $2^d$. As shown in the drawings, the frontmost leaf and the rearmost leaf are provided with spacing strips and slip clamps only on one face.

3 indicates a floor or support for the set of leaves 2. It is provided with one or more bearing members $3^a$ adapted to coöperate with one or more pivot devices $2^e$ carried by the frontmost leaf of the set of leaves 2.

4 indicates pivotal devices for the leaves permitting them to swing or recline singly or in groups. Preferably the pivotal devices 4 comprise connections or gearing between the leaves which operate, when one or more of the leaves are reclined, to move the lower ends of the remaining leaves forwardly.

$2^f$ indicates slide plates carried by the frontmost leaf of the set of leaves 2. The purpose of these slide plates will be later described. They are preferably arranged along the opposing vertical side edges of said leaf and coöperate with the spacing strips $2^c$ on its opposite face to strengthen the adjacent back $2^b$.

5 indicates a guide device for the rearmost leaf. The guide device is preferably pivoted to the rear wall $1^b$ of the casing 1 and engages with the upper edge of the rearmost leaf.

$5^a$ indicates a latch preferably carried by the guide device 5 and arranged thereon at or near its free end. When the leaves 2 are in normal position the device 5 swings into a horizontal position and the latch $5^a$ automatically engages with the upper or free edge of the frontmost leaf and locks the said leaf and all the remaining leaves in normal position. When it is desired to operate the leaves, the latch $5^a$ is pressed upwardly out of engagement with the frontmost leaf which latter is then reclined. This operation raises the rearmost leaf which in turn elevates the guide into an inclined position. When all of the leaves in front of the rearmost leaf are reclined, the upper or free edge of said rearmost leaf engages with the latch $5^a$ and is prevented thereby from being reclined.

6 indicates a series of leaves normally arranged horizontally and supported one upon another. Each of the leaves 6 is preferably similar in construction to the leaves 2.

$6^a$ indicates a base plate upon which the lowermost leaf 6 preferably rests. At $6^b$ the front edge of the base plate $6^a$ is turned over to form a recess which receives the free edge of the lowermost leaf of the set of leaves 6. This turned-over edge $6^b$ operates to detachably hold the leaves 6 on the base $6^a$, in order that they can be removed and placed in a safe place. The turned-over edge is arranged at such distance from a stationary back (to be presently described) as to permit the horizontal positioning of the leaves 6 between said turned-over edge and the back. In placing the leaves 6 in position on the base $6^a$ their front edges are first inclined downwardly so that the free edge of the lowermost leaf can be inserted within the recess formed by the turned-over edge $6^b$. In removing the leaves 6 from the base, the rear ends thereof must be lifted first and moved slightly rearwardly to withdraw the lowermost leaf from said recess.

7 indicates a vertically arranged back relative to which the leaves 6 operate as will be later described. This back 7 is preferably arranged slightly forward of the frontmost leaf of the leaves 2 so that when the leaves 6 are operated into an upright position, the free edge of the uppermost leaf 6 may engage with and be slidably supported by said front leaf 2 in a slightly rearwardly and upwardly inclined position.

8 indicates connections between the leaves 6, permitting the swinging of the leaves relatively to each other. The connections 8 are preferably similar in construction to the pivotal devices 4 for the leaves 2. The connections 8 not only operate to permit the upward swinging of the leaves 6, but also move the remaining horizontal leaves outwardly or away from the back 7. This operation will be clearly understood from Fig. 3 of the drawings. It will also be understood that as the leaves 6 are operated from the horizontal to the upright position, they move or slide downwardly on the back 7 and said front leaf 2, and when moved back to horizontal position, they move upwardly. Thus it will be seen that the front leaf 2 and back 7 coöperate to guide the uppermost leaf in its up and down movements.

9 indicates slide devices carried by the back 7.

$9^a$ indicates slides, preferably comprising anti-friction rollers, carried by the lower edge of the uppermost leaf 6 and engaging with the plates 9.

$9^b$ indicates slide devices, preferably comprising anti-friction rollers, carried by the uppermost leaf 6 at or near its free edge and arranged to slidingly engage with the plates $2^f$ carried by the frontmost leaf 2.

10 indicates a tension device, preferably comprising a coiled spring, having one end fixed to the bottom $1^a$, or the back 7, and its opposite end connected in a suitable manner to the base $6^a$. When one or more of the leaves 6 are operated, the outward movement of the base $6^a$ will place the spring 10 under tension so that when the leaves 6 are returned to normal position, the said spring will automatically move the leaves 6 backward or toward the back 7. It will thus be seen that the tension device 10 yieldingly connects the leaves to the casing 1 and maintains them in normal position against the back 7. Furthermore, the tension of the spring exerted on the base, will operate to maintain the free edge of the lowermost leaf 6 below the turned-over edge $6^b$.

11 indicates guide devices for the base $6^a$, permitting it to operate easily and also keeping it and the leaves 6 in proper position in the casing 1. Of these devices, $11^a$ indicates a pair of plates carried by the bottom $1^a$ each provided with a vertical flange $11^b$ along one longitudinal edge.

$11^c$ indicates sets of anti-friction rollers mounted on the lower face of the base $6^a$ and having rolling engagement with the plates $11^a$. As shown in the drawings, the flange $11^b$ of one plate $11^a$ is arranged along that edge opposite to the edge carrying the flange $11^b$ of the other plate $11^a$, so that the bearing members for the rollers $11^c$ engaging with the flanges $11^b$ on their opposite sides guide the leaves in a direction at right angles to the back and prevent any movement thereof toward either side of the casing.

12 indicates an index device preferably carried by the under face of the uppermost leaf of the set of leaves 6.

To those skilled in the art of making apparatus of the class described, many alterations in construction and widely differing embodiments and applications of our invention will suggest themselves, without departing from the spirit and scope thereof. Our disclosures and the description herein are purely illustrative, and are not intended to be in any sense limiting.

What we claim is—

1. In a filing appliance, the combination of a set of leaves normally arranged in a vertical position, means permitting said leaves to swing relative to each other, a separate set of leaves normally arranged in a horizontal position, connections between them permitting them to swing relative to each into a vertical position, and means for slidably supporting said separate set of leaves, the upright set of leaves coöperating with said supporting means to guide the operated leaves of said separate set in their up and down movements.

2. In a filing appliance, the combination of a set of leaves normally arranged in a vertical position, means permitting said leaves to swing relative to each other, a separate set of leaves normally arranged in a horizontal position, connections between them permitting them to swing relative to each into a vertical position, and means for slidably supporting said separate set of leaves, and permitting the opposite end leaves thereof to move at fixed angles to each other as any of the leaves between them are operated, the said horizontal leaves being arranged forward of said upright leaves whereby the uppermost end leaf of the horizontal leaves is slidably supported by said upright leaves when in operated position.

3. In a filing appliance, the combination of a set of leaves normally arranged in a vertical position, means permitting said leaves to swing relative to each other, a separate set of leaves normally arranged in a horizontal position, connections between them permitting them to swing relative to each into a vertical position, means for slidably supporting said separate set of leaves, the upright set of leaves coöperating with said supporting means to guide the operated leaves of said separate set in their up and down movements, and anti-friction means interposed between said upright set of leaves and the uppermost leaf of the horizontal set of leaves.

4. In a filing appliance, the combination of a set of leaves normally arranged in upright position, a separate set of leaves normally arranged in horizontal position, and devices for guiding the movements of those leaves of the latter set which are operated, including slide means interposed between the uppermost leaf of the said set of leaves and the frontmost leaf of the other set.

5. In a filing appliance, the combination of a set of leaves normally arranged in upright position, a support for the said leaves relative to which the leaves swing from normal position to a horizontal position, a separate set of leaves normally arranged in a horizontal position, a back relative to which the last mentioned leaves swing from normal position to a substantially upright position, gearing between the last mentioned leaves, and slide means interposed between the uppermost leaf of the horizontal set of leaves and the frontmost leaf of the upright leaves and the back, the said frontmost leaf and back operating to slidably support and guide the said horizontal leaves as they are operated.

6. In a filing appliance, the combination of a set of upright leaves, a set of horizontal leaves, means for supporting each of said sets, means automatically engaging with an end leaf of one of said sets to lock the said leaves in normal position, and separate means, including a tension device for maintaining the other set of leaves in normal position, each set of leaves being arranged to form a support for the operated leaves of the other set.

7. In a filing appliance, the combination of an upright set of leaves and a horizontal set of leaves, means permitting the leaves to swing relatively to each other, means for slidably supporting said horizontal set of leaves, the upright set of leaves being arranged to guide the free edge of the uppermost leaf in its up and down movements as one or more of the horizontal leaves are operated, and means for holding the frontmost leaf of the upright set of leaves in normal position during the operation of the horizontal leaves.

8. In a filing appliance, the combination of a set of upright leaves, means for supporting the said upright leaves and permitting them to swing relatively to each other, a back, a set of horizontal leaves arranged to swing from a horizontal position to a substantially upright position, and connections between the horizontal leaves operating, when one or more of the said leaves are operated, to move the remaining horizontal leaves outwardly, relative to said back, the said upright leaves and back coöperating to guide the horizontal leaves when moved into an upright position.

9. In a filing appliance, the combination of a set of upright leaves, means for supporting the said upright leaves and permitting them to swing relatively to each other, a back, a set of horizontal leaves arranged to swing from a horizontal position to a substantially upright position, connections between the horizontal leaves operating, when one or more of the said leaves are operated, to move the remaining horizontal leaves outwardly relative to said back, the said upright leaves and back coöperating to guide the horizontal leaves when moved into an upright position, and anti-friction means between the back and the frontmost leaf of the upright set, and the uppermost leaf of the horizontal set.

10. In a filing appliance, the combination of a set of upright leaves, means for supporting the said upright leaves and permitting them to swing relatively to each other, a set of horizontal leaves arranged to swing from a horizontal position to a substantially upright position, connections between the horizontal leaves, operating, when one or more of the said leaves are operated, to move the remaining horizontal leaves outwardly, the said upright leaves operating to slidingly support the free ends of the horizontal leaves when moved into an upright position, slide devices interposed between the frontmost leaf of the upright leaves and the free end of the uppermost horizontal leaf, and guide devices for the horizontal leaves operating to maintain them in alinement during their outward and rearward movements.

11. In a filing appliance, the combination of a set of upright leaves, a separate set of horizontal leaves, means for supporting each set independently and permitting the leaves of each set to swing relative to adjoining leaves thereof, means for automatically and positively locking one of said sets of leaves in normal position, and means for yieldingly maintaining the other set of leaves in normal position, each set of leaves being arranged to form a support for the operated leaves of the other set.

12. In a filing appliance, the combination of a casing, a set of upright leaves arranged to swing into a horizontal position, means for supporting said leaves in the casing, a set of horizontal leaves arranged to swing into a vertical position, means for slidably supporting said horizontal leaves in the casing, the said sets of leaves being arranged relative to each other whereby the horizontal set operates to support the operated leaves of the upright set, and the upright set of leaves slidably supports the operated leaves of the horizontal set, and means for locking the upright leaves in normal position during the operation of the horizontal leaves.

13. The combination of a casing having a back, an abutment, a set of pivoted leaves arranged normally in upright position against said back, the said abutment being below and substantially in the same vertical plane as the front leaf of said set of leaves, a separate set of leaves normally arranged in horizontal position with their rear or hinged edges engaging said abutment, connections between the leaves of said separate set permitting them to swing relatively to each other, means for slidably supporting the lower leaf of said set of separate leaves, whereby the operated leaves of the separate set move vertically and the unoperated leaves move horizontally as any of the leaves of said set are swung about their respective pivots, the said abutment and front leaf of the upright set of leaves coöperating to slidably support and guide the operated leaves of the other set, and a spring normally exerting its influence through the connections between said horizontal leaves to maintain the operated leaves thereof in sliding engagement with said abutment and the front leaf of the upright set of leaves.

In witness whereof we affix our signatures in the presence of two witnesses.

HARRY J. HICK.
ALBERT F. STAPLES.

Witnesses to the signature of Harry J. Hick:

MILTON BEJACH,
C. T. MORGAN.

Witnesses to the signature of Albert F. Staples:

JOHN D. CATHON.
LEWIS T. COOK.

Copies of this patent may be obtained for five cents each, by addressing the "Commissioner of Patents, Washington, D. C."